(No Model.) 7 Sheets—Sheet 1.

W. PORTEOUS.
REAMING AND TAPPING MACHINE.

No. 463,337. Patented Nov. 17, 1891.

Witnesses.
J. Thomson Cross
G. S. Wentworth

Inventor:
Wm Porteous
per Peck & Rector
his Attorneys.

(No Model.) 7 Sheets—Sheet 2.

W. PORTEOUS.
REAMING AND TAPPING MACHINE.

No. 463,337. Patented Nov. 17, 1891.

Witnesses.
J. Thomson Cross
G. W. Wentworth

Inventor:
Wm Porteous
by Rick Rector
his Attorneys.

(No Model.) 7 Sheets—Sheet 3.

W. PORTEOUS.
REAMING AND TAPPING MACHINE.

No. 463,337. Patented Nov. 17, 1891.

Witnesses.
J. Thomson Cross
G. W. Wentworth

Inventor.
Wm Porteous
by Peck & Rector
his Attorneys.

(No Model.) 7 Sheets—Sheet 4.
W. PORTEOUS.
REAMING AND TAPPING MACHINE.

No. 463,337. Patented Nov. 17, 1891.

Witnesses. Inventor.
J. Thomson Cross Wm Porteous
G. S. Wentworth by Peck & Rector
his Attorneys.

(No Model.) 7 Sheets—Sheet 5.
W. PORTEOUS.
REAMING AND TAPPING MACHINE.
No. 463,337. Patented Nov. 17, 1891.
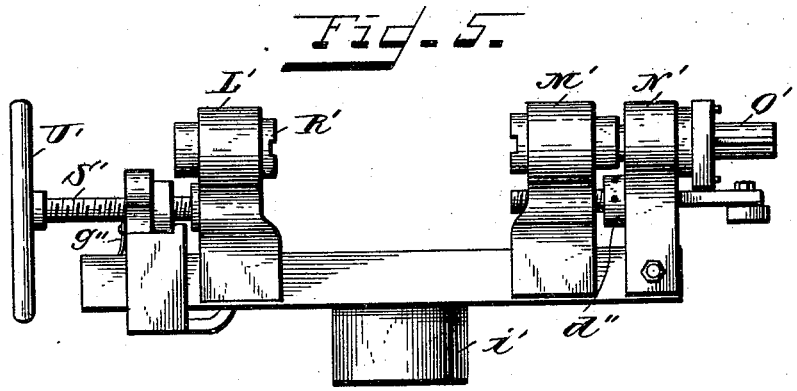
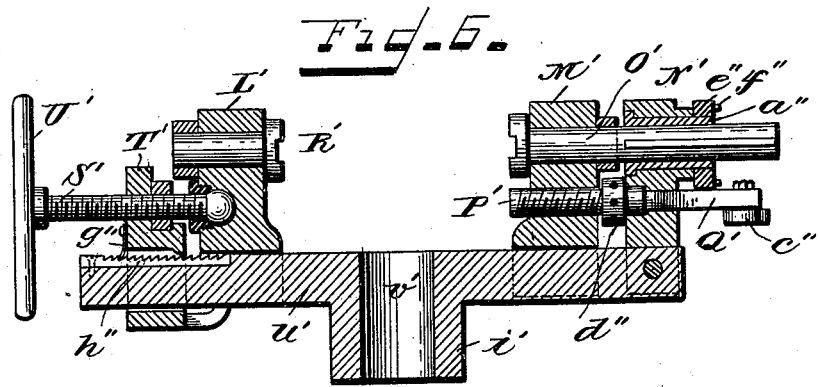
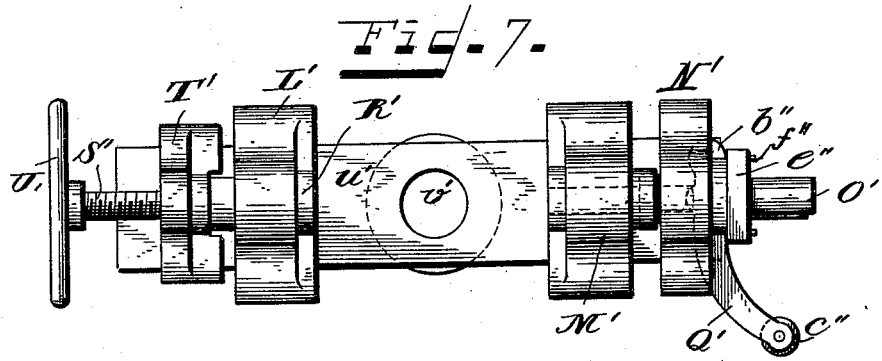

(No Model.) 7 Sheets—Sheet 6.

W. PORTEOUS.
REAMING AND TAPPING MACHINE.

No. 463,337. Patented Nov. 17, 1891.

Witnesses.
J. Thomson Cross
G. Wentworth

Inventor.
Wm Porteous
by Peck & Preston
his Attorneys.

(No Model.) 7 Sheets—Sheet 7.
W. PORTEOUS.
REAMING AND TAPPING MACHINE.
No. 463,337. Patented Nov. 17, 1891.
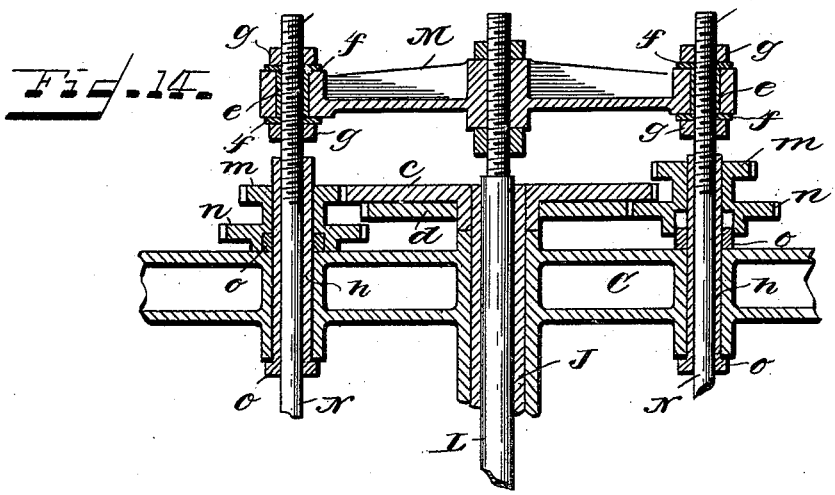
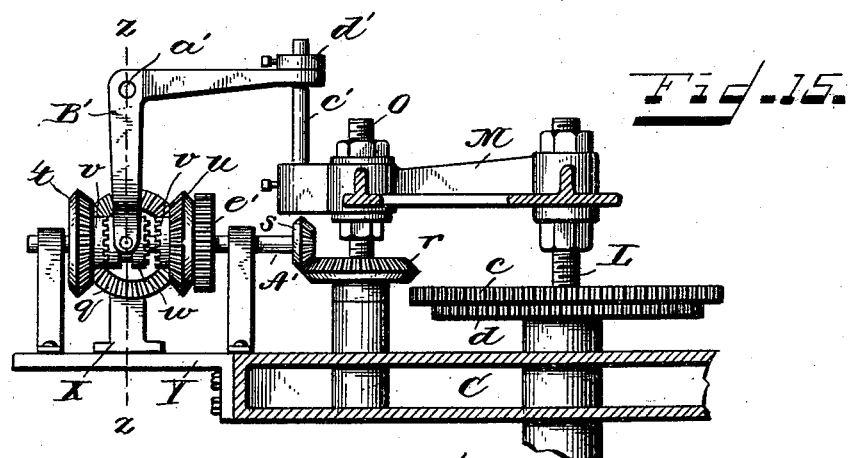
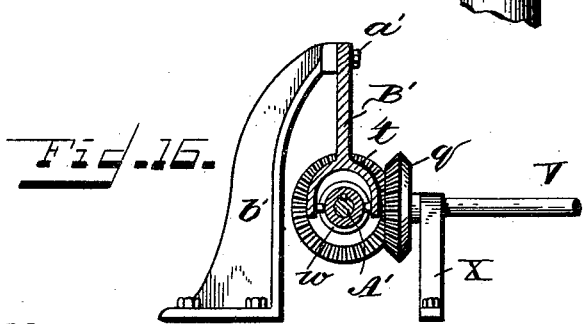

UNITED STATES PATENT OFFICE.

WILLIAM PORTEOUS, OF ELMWOOD PLACE, OHIO.

REAMING AND TAPPING MACHINE.

SPECIFICATION forming part of Letters Patent No. 463,337, dated November 17, 1891.

Application filed February 16, 1891. Serial No. 381,681. (No model.)

*To all whom it may concern:*

Be it known that I, WILLIAM PORTEOUS, a citizen of the United States, residing at Elmwood Place, in the county of Hamilton and State of Ohio, have invented certain new and useful Improvements in Combined Reaming and Tapping Machines, of which the following is a full, clear, and exact description, reference being had to the accompanying drawings, forming a part of this specification.

My invention relates to machines for reaming and tapping cocks, valves, and other brass fittings; and it has for its object the improved construction of such machines, whereby their efficiency is increased and whereby they are rendered as nearly automatic as possible.

The novelty of my invention will be hereinafter set forth, and specifically pointed out in the claims.

Figure 1:
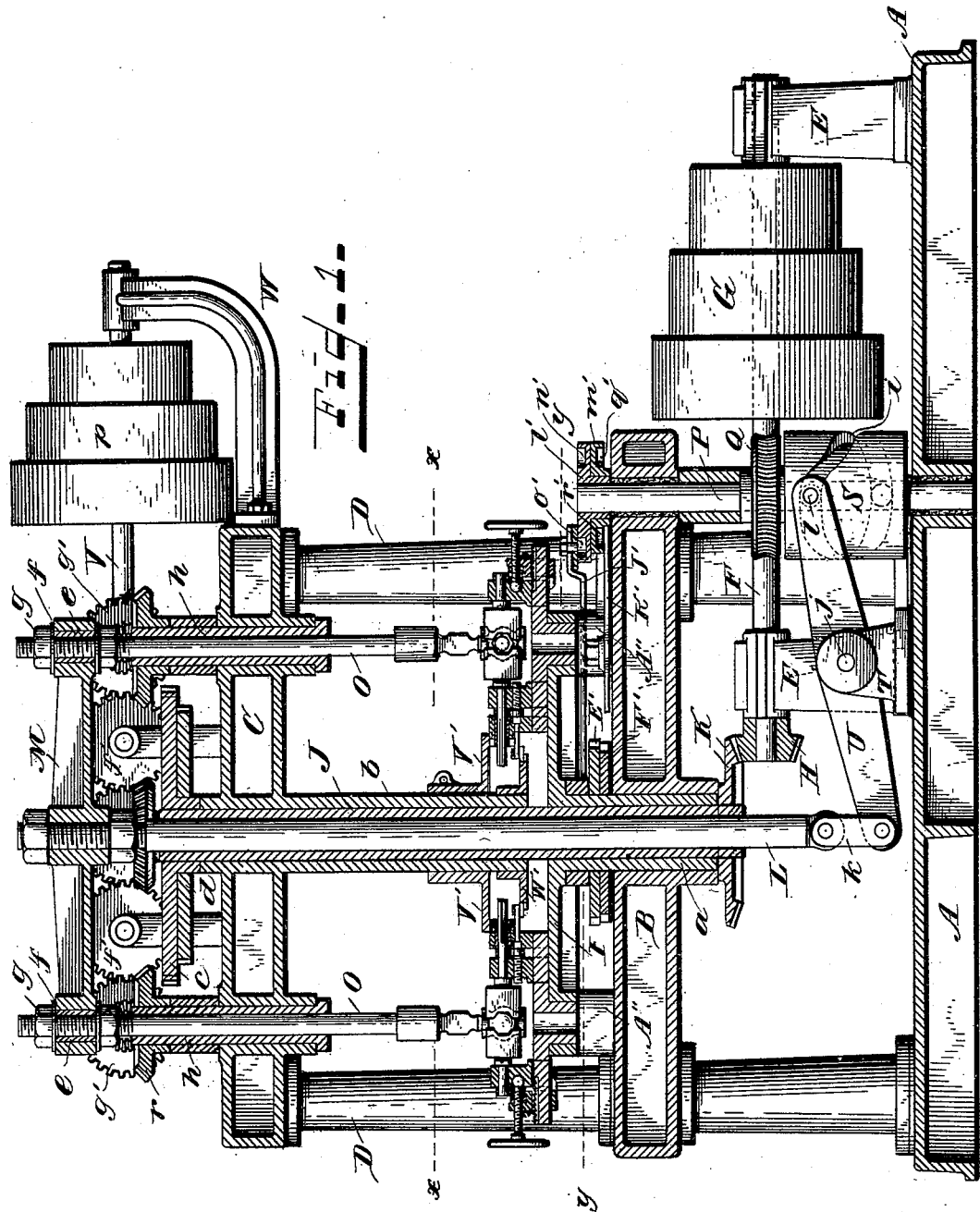
Figure 2:
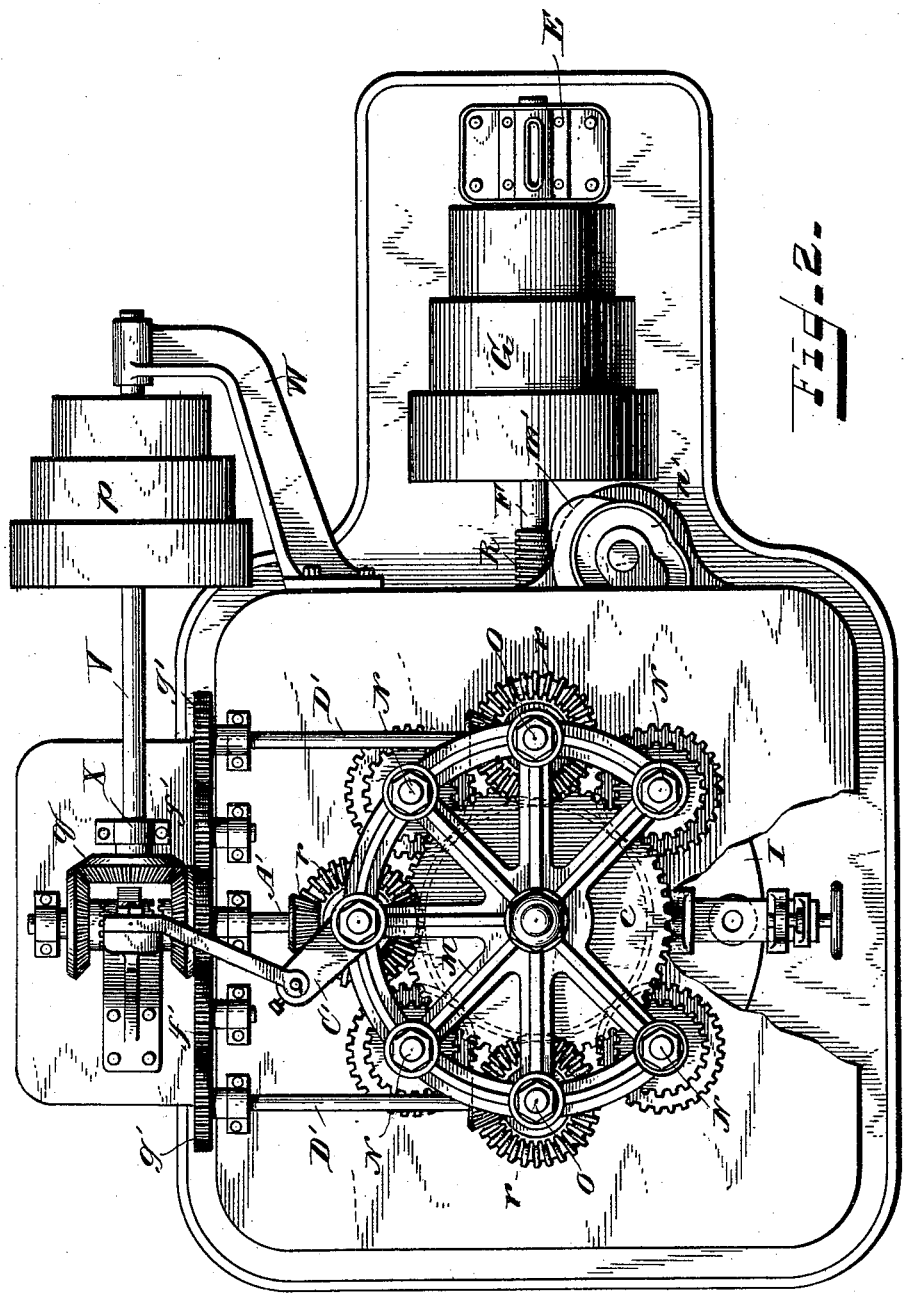
Figure 3:
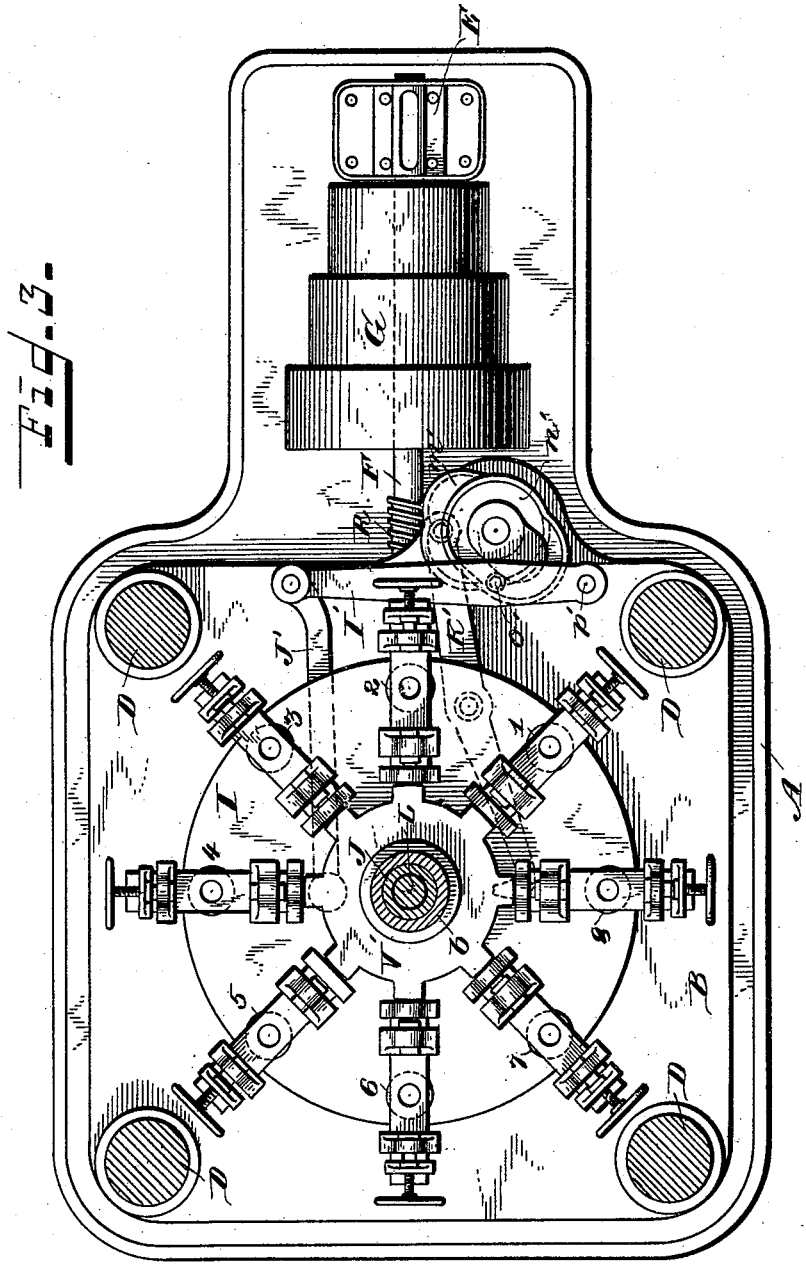
Figure 4:
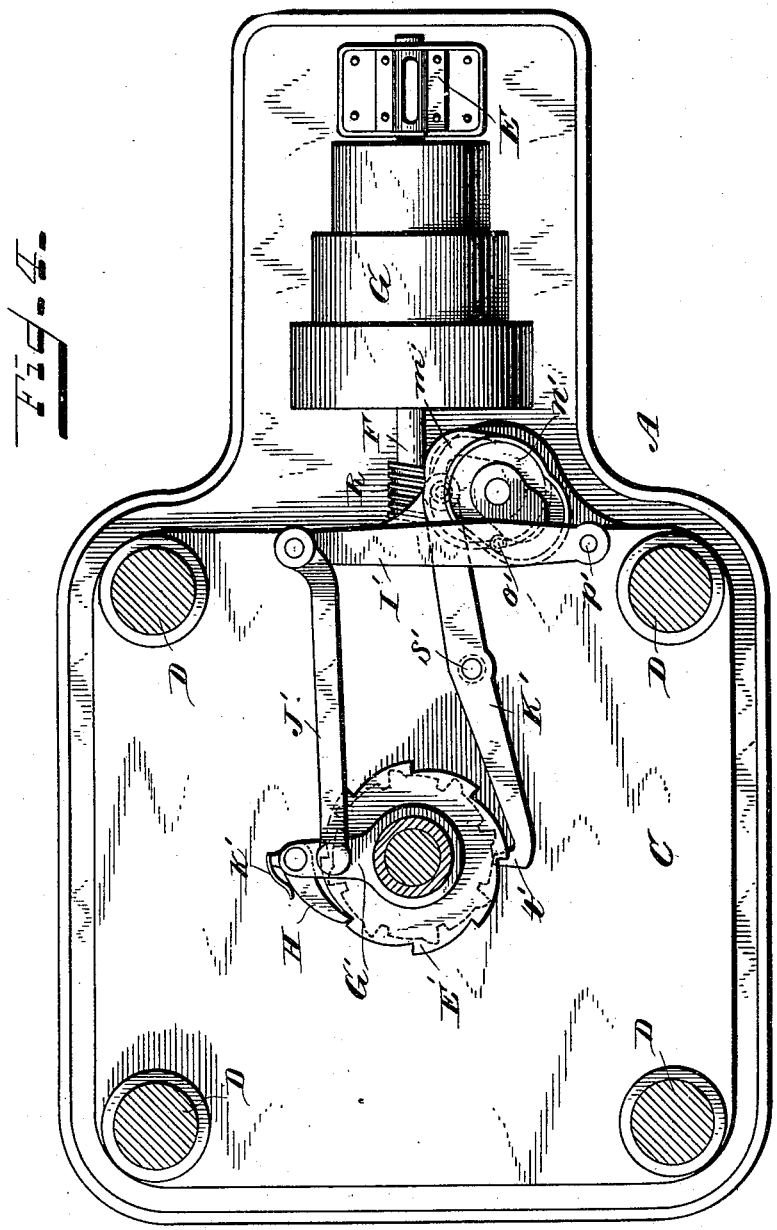
Figure 8:
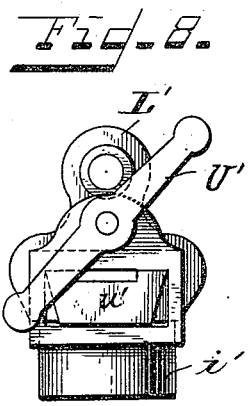
Figure 9:
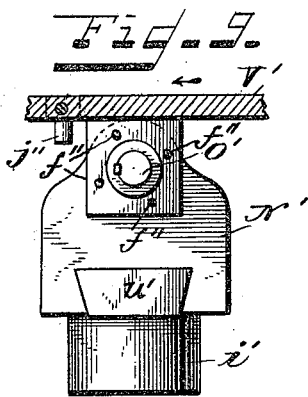
Figure 10:
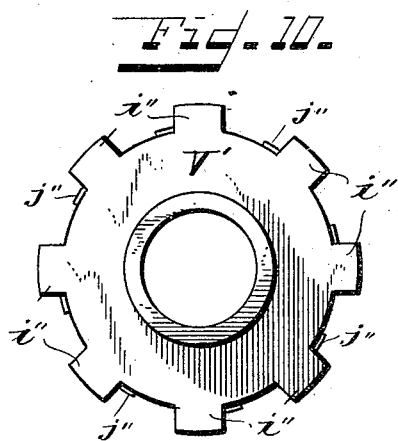
Figure 11:
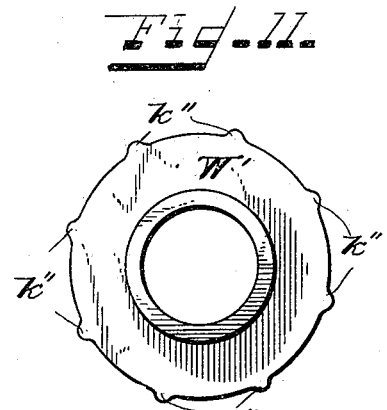
Figure 12:
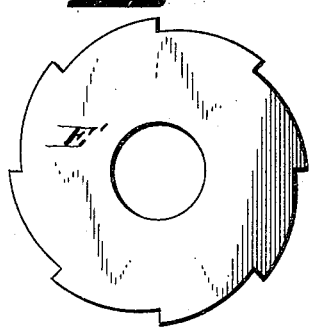
Figure 13:
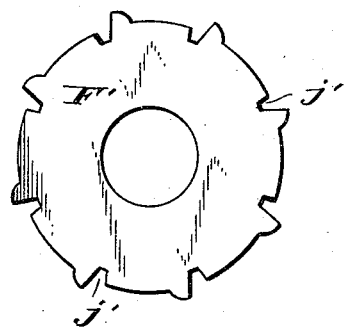

In the accompanying drawings, Figure 1, Sheet 1, is a sectional elevation of a machine embodying my invention. Fig. 2, Sheet 2, is a plan view of the same with a portion of the top frame broken away. Fig. 3, Sheet 3, is a sectional plan on the dotted line $xx$ of Fig. 1. Fig. 4, Sheet 4, is a sectional plan on the dotted line $yy$ of Fig. 1. Fig. 5, Sheet 5, is an enlarged side elevation of one of the work-carrying chucks. Fig. 6, Sheet 5, is a central sectional side elevation of the same. Fig. 7, Sheet 5, is a plan view of the same. Fig. 8, Sheet 6, is a front end elevation of the same. Fig. 9, Sheet 6, is a rear end elevation of the same. Fig. 10, Sheet 6, is an enlarged plan of the chuck-spindle actuator and holder. Fig. 11, Sheet 6, is an enlarged plan view of the chuck-spindle-locking disk. Fig. 12, Sheet 6, is an enlarged plan view of the ratchet-wheel. Fig. 13, Sheet 6, is an enlarged plan view of the locking-disk for the table. Fig. 14, Sheet 7, is a sectional detail of the upper part of the machine. Fig. 15, Sheet 7, is a detail side elevation of the reversing mechanism for the tap-spindles. Fig. 16, Sheet 7, is a sectional detail through the dotted line $zz$ of Fig. 15, looking to the left.

The same letters of reference are used to indicate identical parts in all the figures.

The machine consists, essentially, of a series of vertically reciprocating and rotating tool-carrying spindles set in a circle and a horizontal intermittently-revolving work-carrying table provided with chucks for supporting the work to be acted on by the tools, and mechanism for actuating the parts automatically in such manner that the spindles descend simultaneously and act on a corresponding number of pieces of work and then ascend, during which ascension the table is shifted and the work automatically turned to present a different face to the tools as they again descend.

The frame of the machine, Figs. 1, 2, 3, and 4, is composed of the base A, middle platform B, top platform C, and supporting-posts D for the platforms, all rigidly secured together. Journaled in pillow-blocks E on the base A is a horizontal shaft F, extending under the platform and having upon its outer end the cone-driving pulley G and upon its inner end a small bevel-gear H. Just over the platform B is a horizontal intermittently-revolving circular work-carrying table I, having an extended tubular hub $a$, centrally journaled through the platforms B, Fig. 1. Coincident with the hub $a$ is a tubular bearing $b$, extending through and down from the platform C, with its lower end slightly above the table I. Journaled in the bearing $b$ and through the table I and hub $a$ is a tubular shaft J, having upon its end, beneath the platform B, a bevel-gear K, with which the gear H meshes. Upon the upper end of the shaft J, above the platform C, are secured two gear-wheels $c\ d$ of different diameters. Extending through and guided in the tubular shaft J is a rod or shaft L, having secured upon its upper end, above the gears $c\ d$, a rigid spider-frame M, Figs. 1 and 2, having seven radial arms of different length and connected at their ends by an integral segmental brace. The arms radiate at angles of forty-five degrees to each other, leaving an open right-angular space between two of the arms, as seen in Fig. 2. The seven vertical tool-carrying spindles, four of which are lettered N and the other three O, are set in a circle and are journaled in and carried by the arms of the spider. For purposes of vertical adjustment I have shown the upper end of each spindle threaded and screwed into a bushing $e$, journaled in the end of the arm and held in place by washers $f$ and nuts $g$. Each spindle extends down and is feathered in a tubular shaft $h$, journaled in and through the platform C, and has upon its lower end a socketed head for the reception and retention of the tool.

The mechanism for lowering and raising the rod L, and with it the spider M and spindles N O, so as to lower the latter to act on the work carried by the table I and then lift or retract them to permit the table to be shifted, is illustrated in Figs. 1, 2, and 3, where P is a vertical shaft journaled at its lower end in the base A and at its upper end in a swell or extension of the platform B. Upon the shaft P is secured a worm-wheel Q, which meshes with a worm R upon the main driving-shaft F, and between the worm-wheel Q and the base A is a drum S, having an annular cam-groove $i$ in its periphery. Pivoted, as at $j$, in a bearing T upon the base A is a lever U, whose one end is connected by pivoted links K to the lower end of the rod L and whose outer end carries a lateral pin $l$, upon which is a friction-roller confined in the cam-shaft $i$ of the drum S. It results from this construction that the rotation of the shaft F causes the rotation of the shaft P and drum S and effects the vibration of the lever U and the vertical reciprocation of the rod L, and with it the spider M and spindles N O, as will be readily understood.

The three spindles lettered O are intended to carry taps or dies and require to be rotated in one direction while descending to cut the threads, and to be rotated in the opposite direction while ascending, so as to remove the taps or dies without injury to the cut threads, while the outer spindles N are intended to carry reamers or cutters and are rotated continuously in one direction, both in ascending and descending.

To rotate the spindles N, I secure to each of their tubular shafts $h$, Figs. 2 and 14, two adjustable pinions $m$ $n$, integral, if desired, and so spaced that when the pinion $m$ is caused to mesh with the gear C on the constantly-rotating shaft J the pinion $n$ is below the gear $d$ and out of mesh therewith, as seen on the left of Fig. 14, and when the pinions are adjusted so that $n$ meshes with the gear $d$, $m$ is above the gear $c$ and out of mesh therewith, as seen on the right of Fig. 14. In this way all of the spindles N may be given a uniform speed of rotation, or some of them may be given slower or faster speeds of rotation than the others, as will be readily understood. The pinions $m$ $n$ are held locked in their adjusted positions by set-screws, and the shafts $h$ are held from longitudinal play by upper and lower collars $o$, Fig. 14.

The mechanism for rotating the tap-spindles O and reversing their direction of rotation is illustrated in Figs. 1, 2, 15, and 16, where V is a horizontal shaft parallel to the shaft F, but slightly above the platform C and journaled in a bracket-arm W, and a bearing X upon a bracket-shelf Y, secured to the platform C. Secured upon the shaft V, near the arm W, is a cone driving-pulley $p$, and upon its opposite end is secured a bevel-gear $q$. Each of the tubular shafts $h$, through which the tap-spindles O are feathered, has secured upon its upper end a bevel-gear $v$, Figs. 1 and 2, slightly above the gear $c$, and it will be observed in Fig. 1 that the spindles O are intermediate of the spindles N. Meshing with the central gear $r$ is a bevel-pinion $s$ upon the end of a horizontal shaft A′ at right angles to the shaft V in the same plane therewith and suitably journaled in bearings on the platform C and shelf Y. Loose upon the shaft A′ and meshing on opposite sides of the gear $s$ are two bevel-pinions $t$ $u$, each having on its inner adjacent face a clutch-hub $v$. Feathered on the shaft A′ between the clutch-hubs of the pinions $t$ $u$ is a double clutch $w$, Figs. 15 and 16, having an annular groove in its periphery, with which engages the lower forked arm of a bell-crank shifter B′, pivoted, as at $a'$, to a bracket-arm $b'$. Upon a projecting arm C′, extending from the spider M, is an upwardly-extending adjustable rod $c'$, which passes through a perforation in the upper arm of the shifter B′ at its end. An adjustable collar $d'$ is secured upon the rod $c'$ above the shifter, as shown. Just behind the gear $u$ a pinion $e'$ is secured upon the shaft A′, and meshing with the pinion $e'$ on each side are two idler pinions $f'$, Fig. 2, suitably journaled on the platform C. Meshing with each of the pinions $f'$ on its outer side is a pinion $g'$, fast upon the end of a shaft D′. Each of the two shafts D′ is parallel to the shaft A′, and suitably journaled on the platform C extends back to each of the outer and diametrically-opposite spindles O. The inner end of each shaft D′ carries a bevel pinion $h'$, meshing with its adjacent pinion $v$, as seen in Fig. 2. The pinions $e'$, $f'$, and $g'$ are all in line and of the same diameter. It results from this construction and the adjustment of the parts that when the spider M, rod L, and spindles N O are at the bottom of their downward strokes the collar $d'$ has come into contact with the top of the shifter B′, and has so tilted it as to throw the clutch $w$ into engagement with the clutch-hub $v$ of the pinion $t$, which thereby becomes locked to the shaft A′ and imparts the rotation of the shaft V to the shaft A′, and by means of the gears $e'$ $f'$ $g'$ to the shafts D′, all rotating in the same direction and imparting a simultaneous left-hand rotation of the three spindles O to back out the taps as the spindles at this instant begin to rise. Just as the spindles, spider, and rod L reach the upper end of their stroke the under part of the shifter is caught by the arm C′ and the shifter is tilted back to disengage the clutch $w$ from the hub of the pinion $t$ and to disengage it with the hub of the pinion $u$, thereby reversing the direction of rotation of the shafts A′ and D′, and imparting a right-hand rotation to the spindles O just as they begin to descend, as will be readily understood.

Referring now to the circular intermittently-shifted work-carrying table I, Figs. 1 and 3, I employ eight equidistant work-carrying chucks, Figs. 5, 6, and 7, radially set upon the table and fastened by shanks $i'$, secured in sockets extending in a circle around the table near its periphery. When the table is at rest, during the time the spindles are descending to cause their tools to act on the work, seven of these chucks are directly under the spindles, while the eighth occupies the open space over which there is no spindle, as shown in Fig. 2, and where an attendant stands to take out the finished work and to insert another blank to be acted on.

To intermittently revolve or shift the table just after the tools have left the work on their upstroke, and to hold the table locked during the downstroke of the spindles, I secure a ratchet-wheel E', Figs. 1, 4, and 12, upon the hub $a$ of the table, beneath the same and above the platform B, and beneath the ratchet I secure upon the hub $a$ a locking-disk F', with eight equidistant notches $j'$, Figs. 1, 4, and 13. Pivoted on the hub $a$ above the ratchet F is a pawl-carrier G', having pivoted on its outer side a pawl H', engaging with the ratchet E', and held against the same by a spring $k'$, Fig. 4. Secured upon the upper end of the shaft P just above the platform B are two disks $l'$ $m'$, Figs. 1 and 4, the former having an endless cam-groove $n'$ on its upper face, in which is confined a friction-roller $o'$ on a pin projecting from the under side of a lever I', pivoted at one end of the platform B, as at $p'$, and carrying at its other end a pivoted link J', whose inner end is pivoted to the pawl-carrier G'. On the under side of the disk $m'$ there is an endless cam-groove $q'$, in which is confined a friction-roller $r'$ upon a pin projecting upwardly from the end of a lever K', pivoted as at $s'$ on the platform B, and having at its inner end an inturned detent $t'$ to enter the notches $j'$ successively in the disk F' to lock the table during the time the spindles are on their downstroke, and to be lifted out of each notch during the upper half of the upstroke of the spindles to permit the vibration of the lever I' inward to cause the pawl H' to shift the table one-eighth of a revolution, whereupon the detent becomes again locked in the next notch, and the pawl is then at once retracted to engage the next tooth of the ratchet, as will be readily understood.

Referring now to Figs. 5, 6, 7, 8, and 9, I would thus describe the construction and operation of the work-carrying chucks. Each chuck has a bed-bar $u'$ with a central perforation $v'$ through it and its attaching-shank $i'$ for the passage of the cuttings. The sides of the bar $u'$ are beveled downward, Fig. 9, to form a lock for the sliding chuck-spindle carriers L' M', whose under sides are recessed to slip over and embrace the bar. Upon the inner end of the bar is a fixed block N', having journaled in its upper end a horizontal tubular bearing $a''$, through which the rear end of the inner chuck-spindle O', journaled through the carrier M', passes and is feathered. P' is a set-screw bearing in the carrier M' and having its rear end, not threaded, projecting in a recess in the block N' and bearing against a horizontal lever Q', pivoted as at $b''$, Fig. 7, in the block N', and carrying a friction-roller $c''$ upon its end. The set-screw P' is provided with a perforated turning collar $d''$ interposed between the carrier M' and block N', Figs. 5 and 6. A rectangular nut $e''$ is secured upon the rear projecting end of the tubular bearing $a''$, which nut has three projecting pins $f''$ upon its rear side disposed as shown in Fig. 9. The outer carrier L' has journaled in its upper end a chuck-spindle R' in line with the spindle O', and in its lower outer side is recessed the balled end of a screw S', carried by and bearing in a lock T', loosely surrounding the bar $u'$, and having a toe $g''$, engaging with a ratchet-rack $h''$, recessed in the top of the bar $u'$, as seen in Fig. 6. The outer end of the screw S' is provided with any suitable turning handle U'.

As seen in Fig. 1, clamping-jaws of the usual construction are secured to the adjacent ends of the spindles O' R', by and between which the work is held.

Secured upon the pendent bearing $b$, Figs. 1, 9, and 10, is a disk V', having as many equidistant radial projections $i''$ as there are chucks—in this instance eight. When the table I is at rest, these projections $i''$ rest snugly over the upper sides of the nuts $e''$ and serve to lock the chuck-spindles and work from turning, as seen in Figs. 1 and 9. Projecting down from the periphery of the disk V', between the alternating projections $i''$ and in the path of the pins $f''$ upon the nuts $e''$, are removable pins $j''$, Fig. 9, which as the table is shifted engage one of the pins on each of the nuts $e''$ and turn the same one-quarter, thereby turning the chuck-spindles and the work to present a fresh side to the action of the tools. The location of the pins $j''$ is such that the nuts $e''$ have passed from under the projections $i''$ sufficiently to permit of their being turned far enough to ride under the next projections $i''$ in the path of their travel. Just beneath the disk V' is a second disk W', Figs. 1 and 11, having eight projections $k''$, which engage the rollers $c''$ on the levers Q' when the table I is at rest, and hold the carrier M' rigid while the work is being clamped in the chuck-jaws; but the moment the table begins to shift, the rollers $c''$ ride off the projections $k''$, thereby loosening the carrier M' sufficiently to permit of the easy turning of the chuck-spindles and the work, as before described.

In placing in and removing the work while the table I is at rest the attendant has only to slightly lift the block T' to disengage the toe $g''$ from the rack $h''$, whereupon the carrier L' may be shifted to the desired position and be relocked, and then by giving the screw S' a partial turn the clamping of the work is instantly effected.

Extending up from the platform B are as many supports A'' for the outer edge of the table as there are chucks, and these supports are arranged directly under the chucks when the table is at rest.

From the foregoing it will be seen that seven pieces of work are being acted on simultaneously, and at each shifting of the table a finished piece of work is brought under the open space, Fig. 2, where there is no spindle and where the attendant stands to remove it and insert a fresh blank in the chuck. Supposing the blank to be a valve with three openings to be acted on, I would thus describe its course around the table, referring to Fig. 3, where the position of the chucks are numbered from 1 to 8, the one at 8 having no spindle over it. The blank is properly inserted at 8, and the table shifts it to 1, giving it a turn to bring up an opening, which is dressed by a cutter or reamer. It then passes to 2 without turning, and a tap does its work. In passing to 3 it is given another turn to bring up the second opening, and a cutter or reamer does its work. It next passes to 4 without turning, and a tap acts on it. In passing to 5 it is given another turn to bring up the third opening, and it is acted upon by a cutter or reamer, and then passes without turning to 6, where it is acted on by a tap. It next passes to 7 without turning, and is acted on by a finishing-cutter, and then it passes with a turn to 8, where it is removed.

In certain classes of work dies may be substituted for taps on one or more of the spindles O.

The machine herein described may be modified in various ways, and I do not wish my invention to be understood as limited to the details of construction, for, so far as I know, I am the first to devise a reaming and tapping machine having a horizontal intermittently-revolving work-carrying table provided with chucks and a series of vertically-reciprocating tool-carrying spindles arranged in a circle above said table, and I desire to claim the combination specified as broadly as the terms of my claims express them.

Having thus fully described my invention, I claim—

1. In a reaming and tapping machine, the combination of a horizontal intermittently-revolving work-carrying table provided with chucks, and a series of vertically-reciprocating tool-carrying spindles arranged in a circle over said table, substantially as described.

2. In a reaming and tapping machine, the combination of a horizontal intermittently-revolving work-carrying table provided with chucks, a series of vertically-reciprocating tool-carrying spindles arranged in a circle over said table, means for operating said table and spindles and for automatically turning the work in the chucks during the shifting of the table, substantially as described.

3. In a reaming and tapping machine, the combination of a horizontal intermittently-revolving work-carrying table provided with chucks, a series of vertically-reciprocating tool-carrying spindles arranged in a circle over said table, means for operating said spindles and table and for automatically locking the latter in its working positions, and means for automatically turning the work in the chucks during the shifting of the table, substantially as described.

4. In a reaming and tapping machine, the combination of a horizontal intermittently-revolving work-carrying table provided with chucks, a series of vertically-reciprocating tool-carrying spindles arranged in a circle over said table, and means for automatically reversing the direction of rotation of such of the spindles as carry taps or dies at each end of their strokes, substantially as described.

5. In a reaming and tapping machine having a series of vertically-reciprocating work-carrying spindles arranged in a circle, the combination, with a horizontal work-carrying table beneath said spindles and provided with chucks, of a ratchet-wheel connected to said table, an actuating-pawl for said ratchet, and means for actuating said pawl to intermittently revolve the table, substantially as described.

6. In a reaming and tapping machine having a series of vertically-reciprocating work-carrying spindles arranged in a circle, the combination, with a horizontal work-carrying table beneath said spindles and provided with chucks, of a notched locking-disk connected to said table, a locking-lever engaging said disk, and means for disengaging said lever and intermittently revolving the table, substantially as described.

7. In a reaming and tapping machine having a horizontal intermittently-revolving work-carrying table provided with chucks, and vertically-reciprocating tool-carrying spindles arranged in a circle over said table, the combination, with the chuck-spindles having rectangular nuts thereon, of a fixed locking-disk having projections to engage and turn the nuts and chuck-spindles during the shifting of the table, and other projections to engage and lock the nuts and spindles when the table is at rest, substantially as described.

8. In a reaming and tapping machine, the combination of the shaft F, having a worm R, of the shaft P, having the worm-wheel Q and provided with the cam-disk l', the lever I', engaged by the disk l', the pawl-carrier G', connected to the lever I' by a link J' and provided with a pawl H', the horizontal work-carrying table I, and the ratchet-wheel E', connected to said table and engaged by said pawl, substantially as described.

9. In a reaming and tapping machine, the combination of the shaft F, having a worm R, the shaft P, having the worm-wheel Q and provided with the cam-disk $m'$, the lever K', engaged by the cam-disk $m'$, the horizontal work-carrying table I, and the notched locking-disk F', engaged by the lever K', substantially as described.

10. In a reaming and tapping machine, the combination, with the horizontal intermittently-revolved work-carrying table provided with chucks, of a centrally-guided and vertically-reciprocating rod, a spider carried upon the upper end of said rod, tool-carrying spindles journaled in and carried by said spider and arranged in a circle, and revolving tubular shafts, through which said spindles are guided and in which they are feathered, substantially as described.

11. In a reaming and tapping machine, the combination, with the revolving tubular shaft J, having fast upon its upper end the gears $c\ d$, of the tubular spindle-revolving shafts $h$, having thereon the adjustable gears $m\ n$, the former adapted to mesh with the gear $c$ and the latter with the gear $d$, substantially as described.

12. In a reaming and tapping machine, the combination of the shaft V, gear $q$, fast on the said shaft, shaft A', having the gears $t\ u$ loose thereon and meshing with the gear $q$ on opposite sides thereof, the sliding double clutch $w$, feathered on the shaft A' between the gears $t\ u$, the bell-crank shifter B', engaging the clutch $w$, the shafts D', parallel with and geared to the shaft A', the reciprocating spider M, carrying the rod $c'$, with collar $d'$, and geared connections between the shafts A' D' and the tubular shafts which rotate the tapping-spindles, substantially as described.

13. The herein-described chuck, composed of the bed-bar $u'$, sliding spindle-carriers L' M', having spindles R' O' journaled therein, the block N' for the carrier M', having the tubular bearing $a''$, through which the spindle O' is feathered, the rectangular nut $e''$ on the spindle O', the set-screw P' between the carrier M' and block N', the lever Q', pivoted in the block N' and bearing against the set-screw P', the block T, connected to the carrier T' by the screw S' and having the toe $g''$, and the locking-rack $h''$ in the bar $u'$, substantially as and for the purpose specified.

14. In a reaming and tapping machine, the combination, with the fixed disk W', having projections $k''$, of the intermittently-revolving chucks, whose inner spindle-carriers are provided with set-screws, bearing-blocks for said set-screws, and levers Q', bearing against said set-screws and against said disk, substantially as and for the purpose specified.

15. In a reaming and tapping machine, the combination of the shaft F, having the worm R, the shaft P, having the worm-wheel Q, the drum S on the shaft P, the vertical spindle-carrying rod L, and the lever U, engaging at one end with a cam-groove in the drum S and connected at the other end with the lower end of the rod L, substantially as and for the purpose described.

WILLIAM PORTEOUS.

Witnesses:
J. THOMSON CROSS,
G. S. WENTWORTH.